United States Patent
Ronayne et al.

(10) Patent No.: US 11,188,581 B2
(45) Date of Patent: Nov. 30, 2021

(54) IDENTIFICATION AND CLASSIFICATION OF TRAINING NEEDS FROM UNSTRUCTURED COMPUTER TEXT USING A NEURAL NETWORK

(71) Applicant: FMR LLC, Boston, MA (US)

(72) Inventors: Adrian Ronayne, County Mayo (IE); Chaitra Kamath, Dublin (IE)

(73) Assignee: FMR LLC, Boston, MA (US)

( * ) Notice: Subject to any disclaimer, the term of this patent is extended or adjusted under 35 U.S.C. 154(b) by 913 days.

(21) Appl. No.: 15/592,103

(22) Filed: May 10, 2017

(65) Prior Publication Data

US 2018/0330232 A1  Nov. 15, 2018

(51) Int. Cl.

| | |
|---|---|
| *G06F 16/33* | (2019.01) |
| *G06F 16/35* | (2019.01) |
| *G06F 16/951* | (2019.01) |
| *G06N 3/02* | (2006.01) |
| *G06N 3/08* | (2006.01) |
| *G09B 5/00* | (2006.01) |
| *G06N 3/04* | (2006.01) |

(52) U.S. Cl.
CPC ........ *G06F 16/3331* (2019.01); *G06F 16/353* (2019.01); *G06F 16/951* (2019.01); *G06N 3/02* (2013.01); *G06N 3/084* (2013.01); *G09B 5/00* (2013.01); *G06N 3/0481* (2013.01)

(58) Field of Classification Search
CPC ..... G06F 16/3331; G06N 3/0481; G06N 3/02
See application file for complete search history.

(56) References Cited

U.S. PATENT DOCUMENTS

| | | | |
|---|---|---|---|
| 7,384,267 B1 | 6/2008 | Franks et al. | |
| 7,562,059 B2 | 7/2009 | Scarborough et al. | |
| 9,336,268 B1* | 5/2016 | Moudy | G06F 40/30 |
| 2015/0178265 A1* | 6/2015 | Anderson | G06F 40/274 704/9 |
| 2016/0267380 A1* | 9/2016 | Gemello | G06N 3/084 |
| 2017/0195654 A1* | 7/2017 | Powers | G01J 1/4204 |
| 2018/0158163 A1* | 6/2018 | Zhang | G06Q 50/2057 |

OTHER PUBLICATIONS

Hamdi, "MASACAD: A Multiagent Approach to Information Customization for the purpose of academic advising for students", 2006, IEEE intelligent systems, pp. 60-67. (Year: 2006).*

(Continued)

*Primary Examiner* — Alexey Shmatov
*Assistant Examiner* — Clint Mullinax
(74) *Attorney, Agent, or Firm* — Proskauer Rose LLP

(57) ABSTRACT

Methods and apparatuses are described for generation of a data model for identifying and classifying training needs of individuals. A computer data store stores unstructured text. A server computing device generates a vector for search queries in the unstructured text, and generates a training course classification data model that comprises a multi-layered neural network. The server computing device executes the training course classification model using the vectors as input to generate a training course recommendation output vector. The server computing device updates the training course classification data model based upon a rating value for a training course.

19 Claims, 5 Drawing Sheets

(56) References Cited

OTHER PUBLICATIONS

Marivate et al, "An Intelligent Multi-Agent Recommender System for Human Capacity Building", 2008, 14th Conf. IEEE Mediterranean Electrotechnical Conference, pp. 909-915. (Year: 2008).*
Islam et al, "A New Adaptive Merging and Growing Algorithm for Designing Artificial Neural Networks", 2009, IEEE Transactions on Systems, Man, and Cybernetics—Part B: Cybernetics, vol. 39, No. 3, pp. 705-722. (Year: 2009).*
Kongsakun et al, "Neural network modeling for an intelligent recommendation system supporting SRM for universities in Thailand", 2012, WSEAS Transactions on Computers, 11 (2), pp. 34-44. (Year: 2012).*
(C1) Bernard, Jason et al., "Using Artificial Neural Networks to Identify Learning Styles," AIED 2015, LNAI 9112, 2015, pp. 541-544.
(C2) Halachev, Petar, "Prediction of e-Learning Efficiency by Neural Networks," Cybernetics and Information Technologies, vol. 12, No. 2, 2012, pp. 98-108.
(C3) Kardan, Ahmad A. et al., "Prediction of student course selection in online higher education institutes using neural network," ECOMED, vol. 65, No. C, ISSN: 0360-1315, pp. 1-11 (2013).
(C4) Wabwoba, F. & Fullgence, M. M., "Students Selection for University Course Admission at the Joint Admissions Board (Kenya) using Trained Neural Networks," Journal of Information Technology Education, vol. 10, pp. 334-347 (2011).

\* cited by examiner

IDENTIFICATION AND CLASSIFICATION OF TRAINING NEEDS FROM UNSTRUCTURED COMPUTER TEXT USING A NEURAL NETWORK

TECHNICAL FIELD

This application relates generally to methods and apparatuses, including computer program products, for identification and classification of training needs from unstructured computer text using a neural network.

BACKGROUND

The process of identifying training and development needs in an organization typically happens at three stages or levels—the organizational level, the job level and the person/individual level. In organizational training need analysis, the effort is to ascertain areas in the organization generally that require training interventions. The current computer-based tools used to conduct this type of organizational analysis are inferential in nature and do not give a clear or accurate picture of the training needs. This is the most common type of training need analysis done in most organizations.

When job analysis is conducted using computer-based techniques like gap analysis between the job description and actual performance, work sampling, and the like, the needs identified are at a particular job level. However, this does not indicate the exact training needs of an individual. Though the computerized techniques currently employed at the organization and job levels are useful, they are not sufficient in helping understand whether specific individuals require training and when. Thus, subsequent training initiatives may prove worthless if they are conducted without studying individual data.

With the advent of technology, such as the world wide web, there has been a change in individuals' behavior. Today, individuals rely on, e.g., search engines for entering search queries in order to locate web-based resources to learn more about a topic, or to re-learn a concept. Such search queries are a type of unstructured computer text, with others including online surveys, feedback forms, chat dialog, social media interactions and conversations, and so forth. These types of unstructured computer text are present across all business domains in a variety of forms, and it is becoming crucial to understand critical aspects of the text content so that downstream applications can leverage that knowledge.

When applied to the problem set forth above, the ability to capture and glean useful insight from the unstructured computer text that relates to individuals' inquiries for knowledge and education (e.g., on specific topic areas) is an important tool to predicting and providing meaningful training initiatives. However, due to the sheer volume and complexity of such unstructured computer text in organizations that comprise hundreds or even thousands of individuals, it is difficult to extract meaningful insights that are responsive to individual needs quickly and efficiently from the unstructured computer text without the use of sophisticated computing systems and techniques.

SUMMARY

Therefore, methods and systems are needed to conduct the identification and classification of individual-specific training needs from unstructured computer text in real time using a neural network to produce a high-quality data model that can be used in downstream applications to predict an individual's training needs and provide corresponding training recommendations. The techniques described herein leverage highly-advanced artificial intelligence computing techniques to analyze unstructured computer text (such as that obtained from search queries entered into a search engine) in order to build a neural-network-based data model that is subsequently used to classify training data and predict individual training needs. In addition, the techniques described herein advantageously provide for the incorporation of feedback on training offerings that are defined in the data model, in order to dynamically adjust the data model and emphasize the recommendation of training courses that receive positive feedback and to minimize and/or eliminate the recommendation of training courses that receive negative feedback.

The present methods, systems, and techniques can be advantageously implemented in a variety of real-world applications, including but not limited to unstructured, domain-specific computer text captured as search input to internal and/or external web-based search engines, information repositories (e.g., wiki sites), and the like.

The techniques described herein improve upon existing computerized recommendation engines in that users that are searching for courses are the people who are creating the recommendations. As users search for keywords post-training, this influences how recommendations are delivered to users. A positive response to training will create a new training example mapping where the input is the search parameters and output is the training received. A positive response is signaled if users search parameters deviates from same users normal search parameters.

The invention, in one aspect, features a system used in a computing environment in which unstructured computer text is analyzed for generation of a data model for identifying and classifying training needs of individuals. The system comprises a computer data store including unstructured text, the unstructured text being input as one or more search queries via a web page, input directly into the computer data store via a first computer file, or any combination thereof. The system further comprises a server computing device in communication with the computer data store and programmed to generate a vector for each of the one or more search queries associated with a first user, the vector comprising one or more elements indicating whether a search term is present in the corresponding search query. The server computing device is further programmed to generate a training course classification data model that comprises a multi-layered neural network by: creating a plurality of neurons based upon a plurality of training courses, each neuron assigned a set of feature parameters based upon characteristics of one or more training courses; inserting each neuron in a layer of the neural network; and connecting neurons between each layer of the neural network. The server computing device is further programmed to execute the training course classification model using one or more of the vectors as input to identify one or more neurons in the neural network that map to the vectors and generate a training course recommendation output vector for the first user. The server computing device is further programmed to update the training course classification data model by: receiving a rating value for a training course; identifying one or more neurons in the neural network associated with the training course for which the rating value is received; and when the rating value is positive, creating a copy of one or more of the identified neurons and inserting the copy into the neural network.

The invention, in another aspect, features a computerized method in which unstructured computer text is analyzed for generation of a data model for identifying and classifying training needs of individuals. A computer data store stores unstructured text, the unstructured text being input as one or more search queries via a web page, input directly into the computer data store via a first computer file, or any combination thereof. A server computing device in communication with the computer data store generates a vector for each of the one or more search queries associated with a first user, the vector comprising one or more elements indicating whether a search term is present in the corresponding search query. The server computing device generates a training course classification data model that comprises a multi-layered neural network by: creating a plurality of neurons based upon a plurality of training courses, each neuron assigned a set of feature parameters based upon characteristics of one or more training courses; inserting each neuron in a layer of the neural network; and connecting neurons between each layer of the neural network. The server computing device executes the training course classification model using one or more of the vectors as input to identify one or more neurons in the neural network that map to the vectors and generate a training course recommendation output vector for the first user. The server computing device updates the training course classification data model by: receiving a rating value for a training course; identifying one or more neurons in the neural network associated with the training course for which the rating value is received; and when the rating value is positive, creating a copy of one or more of the identified neurons and inserting the copy into the neural network.

The invention, in another aspect, features a computer readable storage medium comprising programmatic instructions for operation of a computing environment in which unstructured computer text is analyzed for generation of a data model for identifying and classifying training needs of individuals. The instructions are operable to cause a computer data store to store unstructured text, the unstructured text being input as one or more search queries via a web page, input directly into the computer data store via a first computer file, or any combination thereof. The instructions are further operable to cause a server computing device in communication with the computer data store, and including programming to execute a multi-layered neural network, the server computing device programmed to generate a vector for each of the one or more search queries associated with a first user, the vector comprising one or more elements indicating whether a search term is present in the corresponding search query. The server computing device is further programmed to generate a training course classification data model that comprises a multi-layered neural network by: creating a plurality of neurons based upon a plurality of training courses, each neuron assigned a set of feature parameters based upon characteristics of one or more training courses, inserting each neuron in a layer of the neural network, and connecting neurons between each layer of the neural network. The server computing device is further programmed to execute the training course classification model using one or more of the vectors as input to identify one or more neurons in the neural network that map to the vectors and generate a training course recommendation output vector for the first user. The server computing device is further programmed to update the training course classification data model by: receiving a rating value for a training course; identifying one or more neurons in the neural network associated with the training course for which the rating value is received; and when the rating value is positive, creating a copy of one or more of the identified neurons and inserting the copy into the neural network.

Any of the above aspects can include one or more of the following features. In some embodiments, the neural network comprises four or more layers. In some embodiments, one layer of the neural network comprises an output layer, and the neurons in the output layer comprise a classification score which represents a training course recommendation. In some embodiments, at least two layers of the neural network comprise hidden layers.

In some embodiments, the elements in the vector are binary values, and a positive binary value indicates a search term is present in the corresponding search query, and a zero or negative binary value indicates a search term is not present in the corresponding search query. In some embodiments, executing the training course classification model comprises: applying a weight to each of the binary values in the vector used as input and combining the weighted binary values to generate a combined value; identifying a first neuron in a first layer of the neural network that is associated with the combined value; executing an activation function of the identified neuron to generate an output value; and identifying a second neuron in a second layer of the neural network that is associated with the output value and is connected to the first neuron. In some embodiments, the activation function comprises one or more of: a sigmoid function and a rectified linear unit (ReLU) function.

In some embodiments, the training course recommendation output vector corresponds to a training course applicable to the first user based upon the search query. In some embodiments, the rating value is based upon a sentiment associated with feedback for the training course provided by one or more users.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
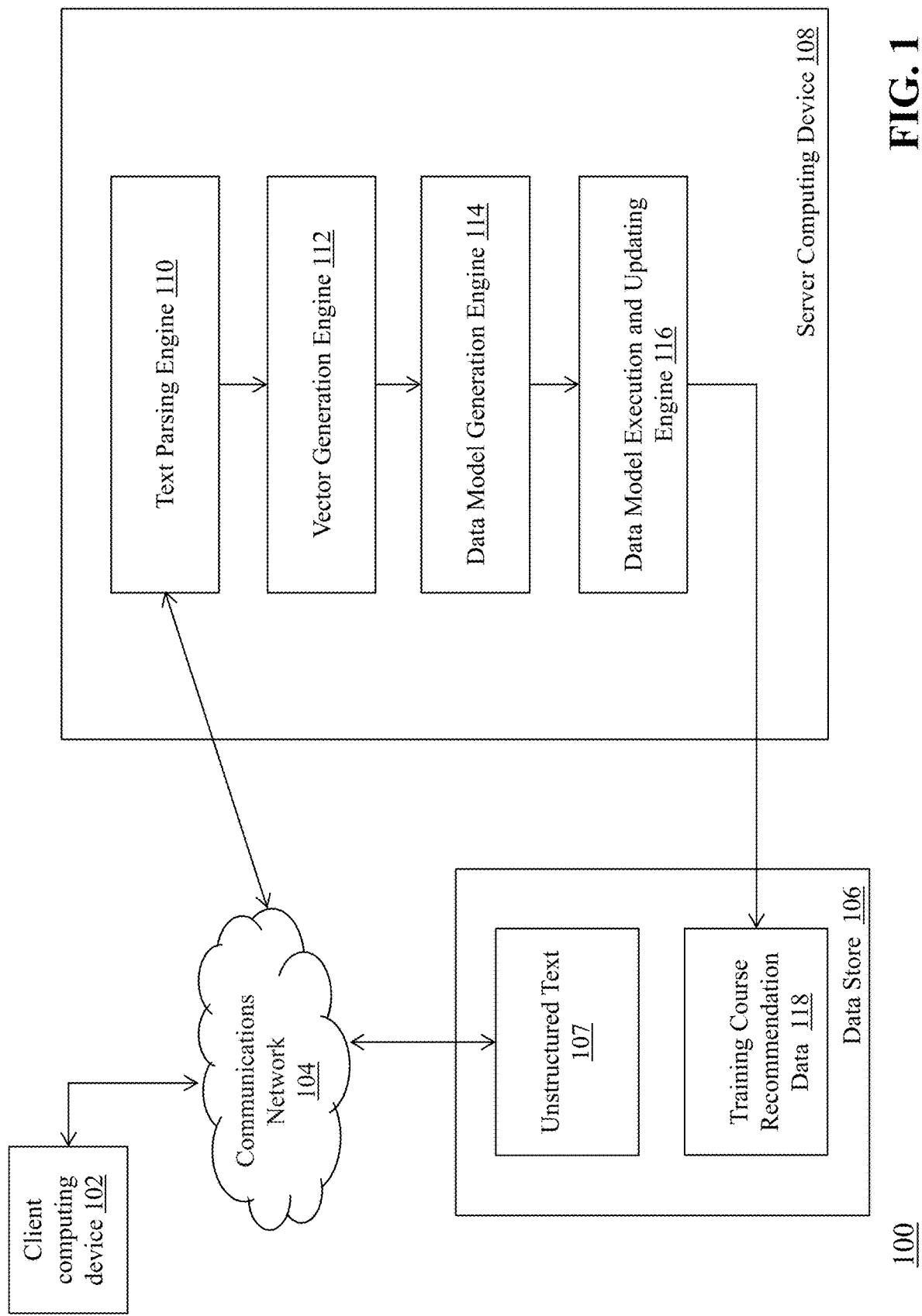
FIG. 1 is a block diagram of a system used in a computing environment in which unstructured computer text is analyzed for generation of a data model for identifying and classifying training needs of individuals.

FIG. 1 is a block diagram of a system 100 used in a computing environment in which unstructured computer text is analyzed for generation of a data model for identifying and classifying training needs of individuals. The system 100 includes a client computing device 102, a communications network 104, a data store 106 with unstructured computer text 107 and training course recommendation data 114, and a server computing device 108 having a processor that executes a text parsing engine 110, a vector generation engine 112, a data model generation engine 114, and a data model execution and updating engine 116.

The client computing device 102 connects to the communications network 104 in order to communicate with the server computing device 106 to provide input and receive output relating to the process of analyzing unstructured computer text for generation of a data model for identifying and classifying training needs of individuals as described herein. For example, client computing device 102 can provide a detailed graphical user interface (GUI) that presents output resulting from the analysis methods and systems described herein, where the GUI is utilized by an operator to review a training course recommendation generated by the system.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices. And as mentioned above, in some embodiments the client device 102 also includes a display for receiving data from the server computing device 108 and/or the data store 106 and displaying the data to a user of the client device 102.

The communication network 104 enables the other components of the system 100 to communicate with each other in order to perform the process of analyzing unstructured computer text for generation of a data model for identifying and classifying training needs of individuals as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 108 is a combination of hardware, including one or more special-purpose processors and one or more physical memory modules, and specialized software engines that execute on the processor of the server computing device 108, to receive data from other components of the system 100, transmit data to other components of the system 100, and perform functions for analyzing unstructured computer text for generation of a data model for identifying and classifying training needs of individuals as described herein. As mentioned above, the processor of the server computing device 106 executes a text parsing engine 110, a vector generation engine 112, a data model generation engine 114, and a data model execution and updating engine 116. The data model generation engine 114 and the data model execution and updating engine 116 include programming that comprises a multi-layered neural network for use in carrying out the techniques described herein.

In some embodiments, the engines 110, 112, 114, and 116 are specialized sets of computer software instructions programmed onto a dedicated processor in the server computing device 108 and can include specifically-designated memory locations and/or registers for executing the specialized computer software instructions. Also, as mentioned previously, the data model generation engine 114 and the data model execution and updating engine 116 further includes a specialized artificial intelligence neural network that implements specific programming functions. Further explanation of the specific processing performed by the engines 110, 112, 114, and 116 will be provided below.

The data store 106 is a computing device (or in some embodiments, a set of computing devices) that is coupled to the server computing device 108 and is configured to receive, generate, and store specific segments of data relating to the process of analyzing unstructured computer text for generation of a data model for identifying and classifying training needs of individuals as described herein. In some embodiments, all or a portion of the data store 106 can be integrated with the server computing device 108 or be located on a separate computing device or devices. For example, the data store 106 can comprise one or more databases, such as MySQL™ available from Oracle Corp. of Redwood City, Calif. The data store 106 includes unstructured computer text 107 and training course recommendation data 118.

The unstructured text 107 is received and stored by the data store 106 via input from a web site/web page, or the unstructured text 107 is received and stored directly into the data store 106 by utilizing a first computer file (e.g., XML, CSV, TXT). A user at client computing device 102 can utilize a GUI provided by the client computing device 102 to select and/or input the unstructured computer text (e.g. directly and/or as a computer file) and transmit the text to the data store 106. In some embodiments, the data store 106 can retrieve the unstructured text from one or more repositories and/or computing systems (e.g., as a data feed and/or a file). For example, a user at client device 102 can enter one or more search queries (e.g., into browser software) and the client device 102 can store the entered queries as unstructured computer text in the data store 106.

The training course recommendation data 118 is generated via the processing of the engines 110, 112, 114, 116 on the unstructured computer text 107, as will be described in greater detail below. In some embodiments, the training course recommendation data 118 represents a one or more training course recommendations for a particular user (i.e., from a list or catalog of available training courses) generated by the engines 110, 112, 114, 116. The recommendation data 118 can be used to present specific training initiatives and course offerings to, e.g., a user at client device 102 via GUI.

Figure 2A:
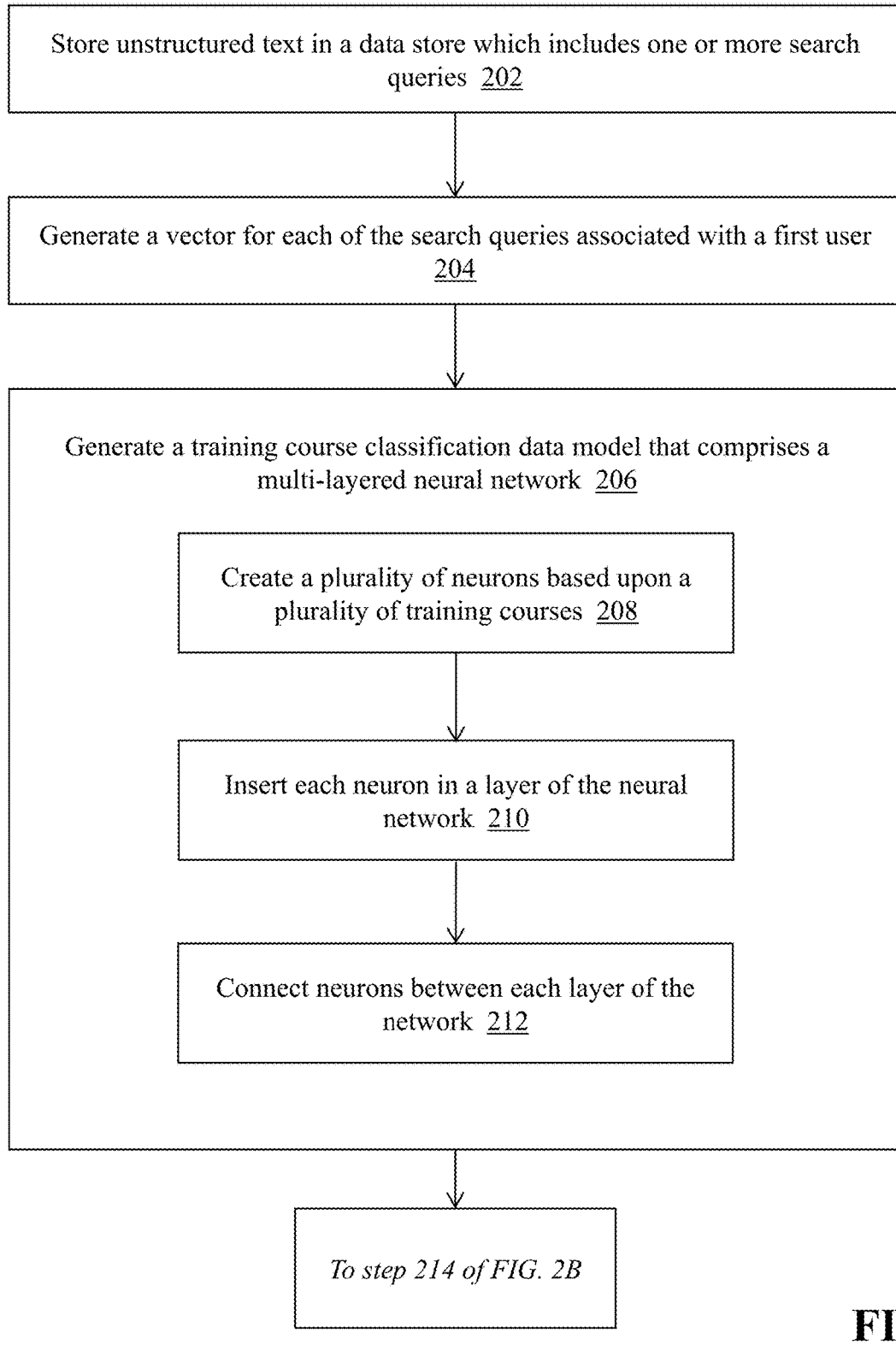
FIGS. 2A and 2B comprise a flow diagram of a method in which unstructured computer text is analyzed for generation of a data model for identifying and classifying training needs of individuals.
Figure 2B:
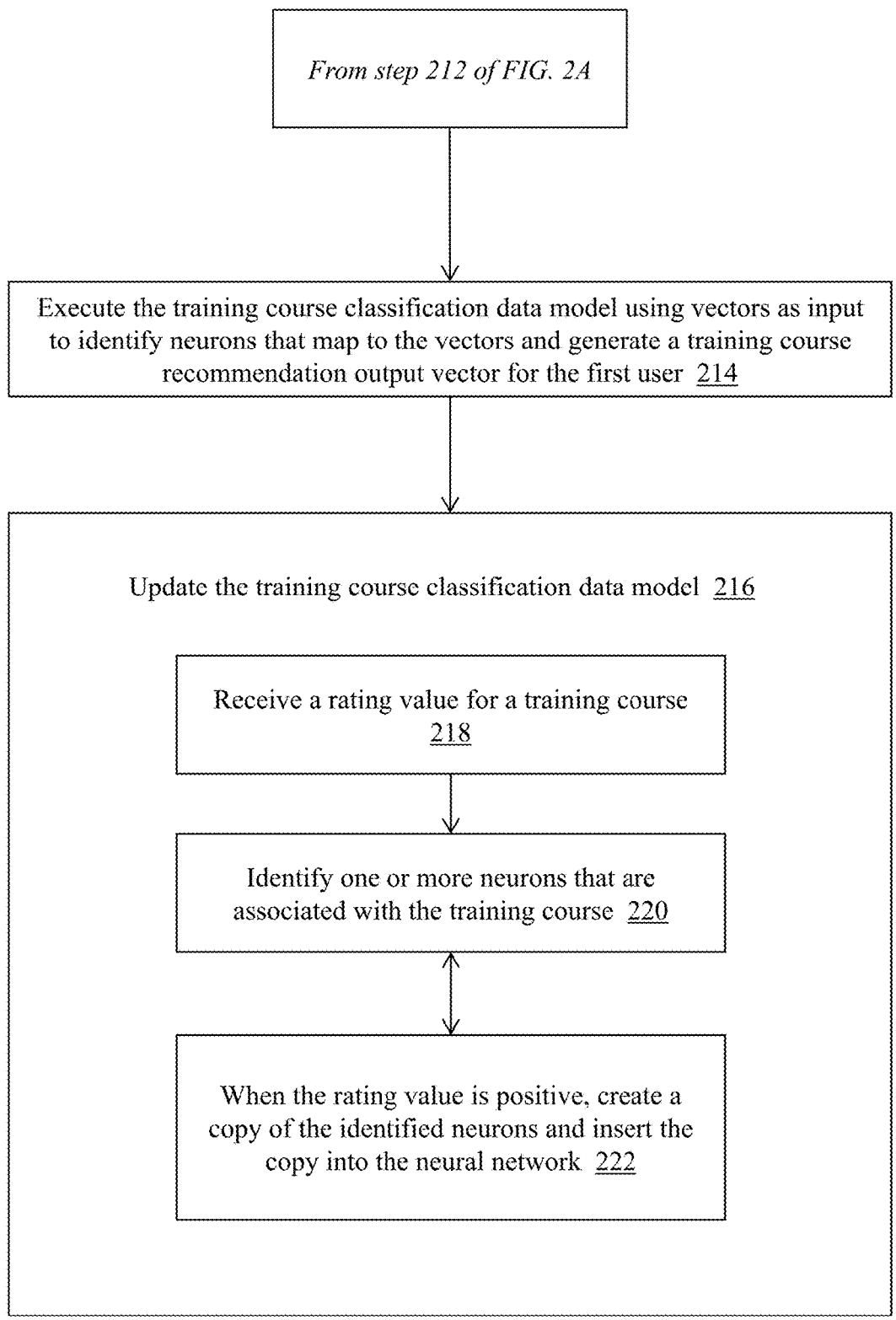

FIGS. 2A and 2B comprise a flow diagram of a method in which unstructured computer text is analyzed for generation of a data model for identifying and classifying training needs of individuals, using the system 100 of FIG. 1. The data store 106 stores (202) unstructured computer text 107 that is input to the data store 106 in a number of different ways—such as via a web page, via a computer file, or a combination of both.

In one example, the unstructured computer text can comprise data derived from a variety of sources, including but not limited to words, terms, and/or phrases that are entered into an application on client device 102 (e.g., a browser interface) for the purpose of using the entered text as a search query on one or more specified websites (e.g., URLs). One example of a search query is "angularjs java nodejs," which may relate to a user at client device 102 who is interested in learning about specific programming topics. It should be appreciated that the unstructured computer text 107 stored at data store 106 can be an aggregation of unstructured text collected from a plurality of client devices and users. In some embodiments, each search query is augmented with various metadata that provides context regarding the search, including but not limited to user ID, user name, device ID, IP address, timestamp, and the like. In addition, portions of the metadata can be used to retrieve additional context information regarding the search—for example, a user ID in the metadata can be used to retrieve a user profile for the user ID, which can include data such as job title, role, name, skills, programming languages, and so forth.

In some embodiments, the unstructured text can be delimited, meaning that each word or phrase is separated by a specific delimiter or set of delimiters (e.g., an asterisk or a semi-colon) in order for the system 100 to quickly and efficiently segment the entire corpus of unstructured text into individual segments. It should be appreciated that, based upon the content of the unstructured text, the system can use a delimiter that is unique or does not regularly appear in the unstructured text to ensure that the unstructured text is not erroneously parsed. Upon receiving the unstructured computer text (e.g., from client device 102), the data store 106 stores (202) the text for retrieval and use by the server computing device 108 as described below.

First, the text parsing engine 110 of the server computing device 108 retrieves all or a portion of the unstructured computer text 107 (e.g., the portion of unstructured computer text that corresponds to one or more search queries for a specific user) from the data store 106 and performs one or more functions on the unstructured text—such as parsing, removing extraneous or insignificant characters (e.g., '&', '+', punctuation, spaces), formatting, and the like. The text parsing engine 110 can also tokenize the search queries—where each token can comprise a single search term or phrase in the overall search query. In one embodiment, a token is a segment of the line of unstructured text that is separated by one or more spaces. Using the example search query from above, the engine 110 breaks the query "angularjs java nodejs" down into the following tokens: "angularjs," "java," and "nodejs." In some embodiments, the tokens are stored in the data store 106 as being associated with the particular search query in the unstructured text. It should be appreciated that other text processing functions can be contemplated for use in the text parsing engine 110 without departing from the scope of invention described herein.

The text parsing engine 110 then distributes at least a portion of the tokenized search queries to the vector generation engine 112. The vector generation engine 112 generates (204) a vector for each of the search queries associated with, e.g., a first user. In this context, a vector comprises a numeric representation of the search query, where elements in the vector correspond to one or more of the search terms contained in the search query. For example, the vector can include elements that represent all or a portion of the potential search terms to be present in a search query, where each element is set to a particular value (e.g., 1) if the search term is present in the search query and each element is set to another particular value (e.g., 0) if the search term is not present in the search query. In a simplified example where the universe of potential search terms is limited to "angularjs java nodejs," a user may enter the search query "angularjs nodejs." Thus, the vector generated by the engine 112 for the search query "angularjs nodejs" would be:

because the term "angularjs" appears in the query (setting the first element in the vector to 1), the term "java" does not appear in the query (setting the second element in the vector to 0), and the term "nodejs" appears in the query (setting the first element in the vector to 1).

It should be appreciated that, in some embodiments, the vector generation engine 112 can generate one or more vectors for a particular user that correspond to a merging and/or aggregation of a plurality of different search queries over time—and the vector values can be weighted or otherwise emphasized depending on a variety of factors, such as the number of times that a search term appeared in the user's search queries, the time that has elapsed from when the search term last appeared in the user's search queries, and so forth.

The data model generation engine 114 then generates (206) a training course classification data model that comprises a multi-layered neural network. As used herein, the neural network is comprised of a plurality of interconnected neurons, each of which corresponds to a data processing unit, which are organized in layers within the overall classification data model. A neural network can have a plurality of layers, that are typically made up of neurons that each contain an activation function. Exemplary activation functions that can be used include, but are not limited to, sigmoid functions and rectified linear unit (ReLU) functions.

Some of layers in the neural network are referred to as hidden layers. In the hidden layers, the neurons perform the data processing using a system of weighted connections between the neurons and neurons in previous and subsequent layers. A neural network also has an input layer, at which the input (e.g., the vector described above) to the neural network is provided. A neural network also has an output layer, at which the output resulting from processing the input through the various layers of the neural network is provided. Generally, neurons in the input and output layers do not contain an activation function. In some embodiments, each hidden layer neuron is programmed as an algorithm that receives one or more inputs, executes a data processing function, and returns an output. Each neuron can be a logical processing unit and/or physical processing unit—embodied in hardware, software, or both.

To generate the training course classification data model, the engine 114 creates (208) the plurality of neurons that make up the neural network based upon a plurality of training courses. As the sigmoid activation function generates a value less than 1 and greater than 0, the weights for the network are set close to these sigmoid values. In this embodiment, the activation function for each layer is the same—the sigmoid activation function. Each neuron is a weight vector, when added to together this vector of weights represents a vector of vectors, in other words: a matrix. The matrix is stored within, e.g., the volatile memory of the server computing device 108 executing the machine learning model. The server computing device 108 periodically writes the current model state to data storage (e.g., data store 106) in the event that it must be restored due to, e.g., a system hardware failure. Each neuron has associated input values; these values are either training data inputs or the outputs of other neural network layers. The neuron outputs are the result of applying the sigmoid activation function to the sum of the inputs.

For example, the engine 114 creates a neuron by receiving or determining one or more characteristics of a training course and assigns to the neuron a set of feature parameters that are based upon the training course characteristics. The engine 114 then inserts (210) the neurons into a layer of the neural network and connects (212) neurons between each layer of the network.

A key component of generating the training course classification data model is training the underlying neural network to be able to produce accurate predictions based upon the input vector. There are several stages: forward propagation, back propagation, and gradient descent.

Figure 3:
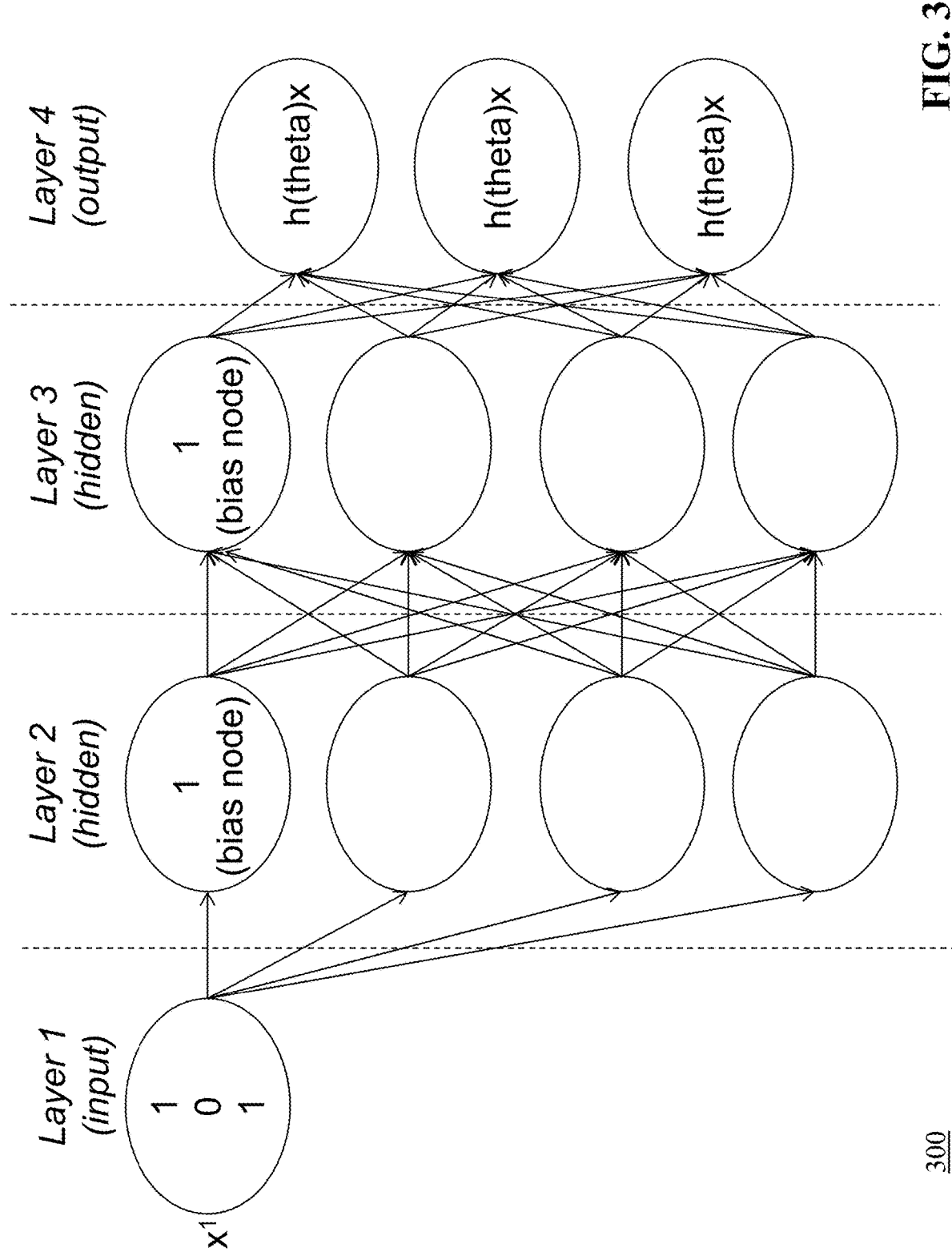
FIG. 3 is an exemplary forward propagation diagram of a multi-layered neural network.

Using the example vector above ([1,0,1]), the engine 114 uses the vector as input to train the neural network. In the examples below, the training output vector is ([1,1,1]) which represents the training course classification group that is expected to be generated by the classification data model when the input vector ([1,0,1]) is used. The first stage of training is forward propagation, in which the input vector is used to traverse the neural network to arrive at an output, which is then compared with the desired and/or output value to determine whether there is error present in the network. An exemplary forward propagation diagram 300 of the multi-layered neural network is shown in FIG. 3. As shown in FIG. 3, the input vector at Layer 1 is provided to the hidden layer (Layer 2) of the neural network via the synapses that connect the input Layer 1 to the neurons in Layer 2. These neurons receive the weighted input values and execute an activation function to generate new values, which are then passed on to Layer 3 via the synapses that connect the neurons between Layer 2 and Layer 3. The neurons in Layer 3 receive the values from Layer 2 and execute an activation function to generate new values, which are provided as output at Layer 4 The output is then compared to the desired output value (e.g., using a loss function), and an error value (h(θ)x) is calculated for each neuron in Layer 4.

Exemplary calculations to support the above example are set forth below:

$$x^1 \text{ (Training Example)} = \begin{bmatrix} 1 \\ 0 \\ 1 \end{bmatrix}$$

$$y^1 = \text{(Training example output)} = \begin{bmatrix} 1 \\ 1 \\ 1 \end{bmatrix}$$

The training example is a vector where each element of the vector represents the presence or absence of a search term. As shown above, [1 0 1] means that search terms at positions 0 and 2 are present, but the search term at position 1 is not present. In this example, [1 1 1] represents a sample group that is determined by training curators.

$$\theta_1 = \begin{bmatrix} 1 & 1 & 1 \\ 1 & 0 & 1 \\ 1 & 0 & 1 \end{bmatrix} \theta_2 = \begin{bmatrix} 1 & 1 & 1 \\ 1 & 1 & 0 \\ 1 & 0 & 0 \end{bmatrix} \theta_3 = \begin{bmatrix} 1 & 1 & 1 \\ 1 & 1 & 0 \\ 1 & 0 & 0 \end{bmatrix}$$

Each theta value above represents what is multiplied in order to compute the value for the next layer. The theta values are weights between each neuron. Each theta matrix can be mapped to a layer. For example, theta1 maps layer1 to layer2, theta2 maps layer2 to layer3. This can be generalized to theta_n maps layer_n to layer_n+1.

Assign a^1 to training example x_1:

$$a^1 = x_1$$

Compute the value of moving from layer1 to layer 2:

$$z^2 = \begin{bmatrix} 1 & 1 & 1 \\ 1 & 0 & 1 \\ 1 & 0 & 1 \end{bmatrix} * \begin{bmatrix} 1 \\ 0 \\ 1 \end{bmatrix} = \begin{bmatrix} 2 \\ 2 \\ 2 \end{bmatrix}$$

As shown below, g is the sigmoid function that is applied to each element. +1 is the bias node. Adding bias is a general rule in neural network design; bias aids in making the prediction more explicit:

$$a_1^2 = g(2) + 1 = 1.88$$

$$a_2^2 = g(2) + 1 = 1.88$$

$$a_3^2 = g(2) + 1 = 1.88$$

$$z^3 = \begin{bmatrix} 1 & 1 & 1 \\ 1 & 1 & 0 \\ 1 & 0 & 0 \end{bmatrix} * \begin{bmatrix} 1.88 \\ 1.88 \\ 1.88 \end{bmatrix} = \begin{bmatrix} 5.34 \\ 3.76 \\ 1.88 \end{bmatrix}$$

$$a_1^3 = g(5.34) + 1 = 1.997$$

$$a_2^3 = g(3.61) + 1 = 1.997$$

$$a_3^3 = g(1.88) + 1 = 1.868$$

$$z^4 = \begin{bmatrix} 1 & 1 & 1 \\ 1 & 1 & 0 \\ 1 & 0 & 0 \end{bmatrix} * \begin{bmatrix} 1.997 \\ 1.997 \\ 1.868 \end{bmatrix} = \begin{bmatrix} 5.842 \\ 3.994 \\ 1.997 \end{bmatrix}$$

$$h_{\theta_1} = g(5.839) + 1 = 1.997$$

$$h_{\theta_2} = g(3.917) + 1 = 1.981$$

$$h_{\theta_3} = g(1.997) + 1 = 1.88$$

5.839, 3.917, 1.997 are the estimated coefficient values of the update function and are parameters to the g sigmoid function.

Thus, the error values attributable to the neurons in the output layer are determined by:

$$\text{Error of neuron 1 in layer 4 } \delta_1^4 = 1.997 - 1 = .997$$

$$\text{Error of neuron 2 in layer 4 } \delta_2^4 = 1.981 - 1 = .981$$

$$\text{Error of neuron 3 in layer 4 } \delta_3^4 = 1.88 - 1 = .88$$

$$\text{Error of layer 4} = \delta^4 = \begin{bmatrix} .997 \\ .981 \\ .88 \end{bmatrix}$$

Figure 4:
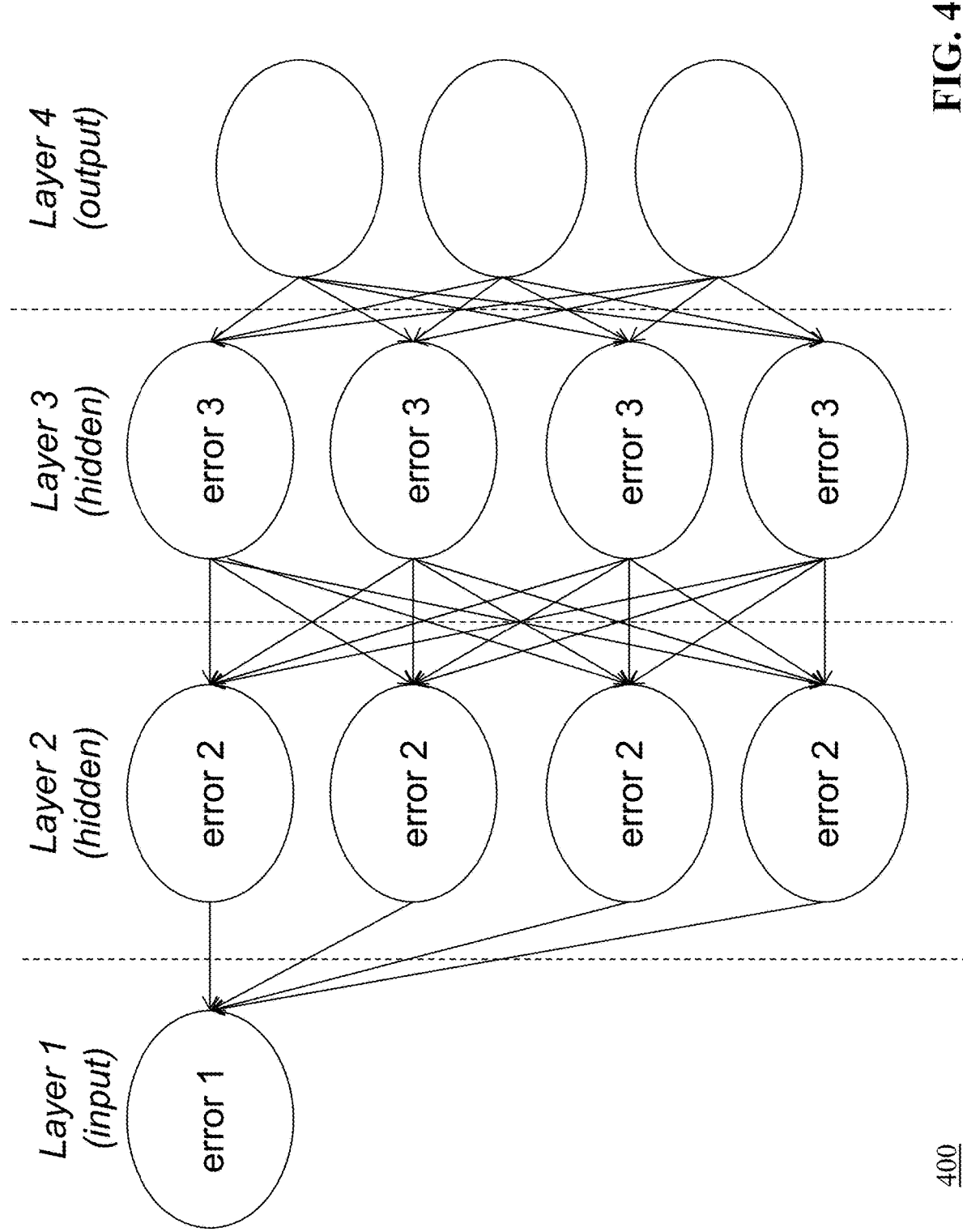
FIG. 4 is an exemplary backpropagation diagram of a multi-layered neural network

The next stage of training the neural network is backpropagation, where the engine 114 takes the error values determined during the forward propagation step, and propagates the errors backwards through the neural network (starting at the output layer) until each neuron has an error value associated with it—the error value approximately representing the neuron's contribution to the original output. An exemplary backpropagation diagram 400 of the multi-layered neural network is shown in FIG. 4. As shown in FIG. 4, the output error values at Layer 4 are provided to the hidden layer (Layer 3) of the neural network via the synapses that connect the output Layer 4 to the neurons in Layer 3. These neurons receive the error values and execute a loss function (also called a cost function) to generate new error values (e.g., error 3), which are then passed on to Layer 2 via the synapses that connect the neurons between Layer 3 and Layer 2. The neurons in Layer 2 receive the error values from Layer 3 and execute a cost function to generate new error values (e.g., error 2), which are provided to Layer 1 to determine an error value (e.g., error 1).

Exemplary calculations to support the above example are set forth below:

Error of layer 3 =

$$\delta^3 = \begin{bmatrix} 1 & 1 & 1 \\ 1 & 1 & 0 \\ 1 & 0 & 0 \end{bmatrix}^T * \begin{bmatrix} .997 \\ .981 \\ .88 \end{bmatrix} .* \left( \begin{bmatrix} 1.997 \\ 1.977 \\ 1.868 \end{bmatrix} .* \left( 1 - \begin{bmatrix} 1.997 \\ 1.977 \\ 1.868 \end{bmatrix} \right) \right)$$

$$\delta^3 = \begin{bmatrix} 1 & 1 & 1 \\ 1 & 1 & 0 \\ 1 & 0 & 0 \end{bmatrix} * \begin{bmatrix} .997 \\ .981 \\ .88 \end{bmatrix} .* \left( \begin{bmatrix} .997 \\ .977 \\ .868 \end{bmatrix} .* \left( \begin{bmatrix} .997 \\ .977 \\ .868 \end{bmatrix} \right) \right)$$

$$\delta^3 = \begin{bmatrix} 1 & 1 & 1 \\ 1 & 1 & 0 \\ 1 & 0 & 0 \end{bmatrix} * \begin{bmatrix} .997 \\ .981 \\ .88 \end{bmatrix} .* \begin{bmatrix} .994 \\ .995 \\ .753 \end{bmatrix}$$

$$\delta^3 = \begin{bmatrix} 1 & 1 & 1 \\ 1 & 1 & 0 \\ 1 & 0 & 0 \end{bmatrix} * \begin{bmatrix} .991 \\ .976 \\ .663 \end{bmatrix}$$

$$\delta^3 = \begin{bmatrix} 2.63 \\ 1.97 \\ .99 \end{bmatrix}$$

Computed error of layer4:

$$\begin{bmatrix} .997 \\ .981 \\ .88 \end{bmatrix}$$

The engine 114 back propagates the error of layer 4 to layer 3 in order to determine the error value of layer 3 which is:

$$\begin{bmatrix} 2.63 \\ 1.97 \\ .99 \end{bmatrix}$$

Matrix multiplication is not commutative; reordering the operations produces different results.

$$\left( \begin{bmatrix} 1.997 \\ 1.977 \\ 1.868 \end{bmatrix} .* \left( 1 - \begin{bmatrix} 1.997 \\ 1.977 \\ 1.868 \end{bmatrix} \right) \right)$$

is the result of calculating the first derivative of the activation function.

As shown below, the calculation is the same as above, but for determining the error of layer2 instead of layer3:

Error of layer 2 =

$$\delta^2 = \begin{bmatrix} 1 & 1 & 1 \\ 1 & 1 & 0 \\ 1 & 0 & 0 \end{bmatrix}^T * \begin{bmatrix} 2.63 \\ 1.97 \\ .99 \end{bmatrix} .* \left( \begin{bmatrix} 1.88 \\ 1.88 \\ 1.88 \end{bmatrix} .* \left( 1 - \begin{bmatrix} 1.88 \\ 1.88 \\ 1.88 \end{bmatrix} \right) \right)$$

$$\delta^2 = \begin{bmatrix} 1 & 1 & 1 \\ 1 & 1 & 0 \\ 1 & 0 & 0 \end{bmatrix} * \begin{bmatrix} 2.63 \\ 1.97 \\ .99 \end{bmatrix} .* \left( \begin{bmatrix} 1.88 \\ 1.88 \\ 1.88 \end{bmatrix} .* \left( \begin{bmatrix} .88 \\ .88 \\ .88 \end{bmatrix} \right) \right)$$

$$\delta^2 = \begin{bmatrix} 1 & 1 & 1 \\ 1 & 1 & 0 \\ 1 & 0 & 0 \end{bmatrix} * \begin{bmatrix} 2.63 \\ 1.97 \\ .99 \end{bmatrix} .* \begin{bmatrix} 1.654 \\ 1.654 \\ 1.654 \end{bmatrix}$$

$$\delta^2 = \begin{bmatrix} 1 & 1 & 1 \\ 1 & 1 & 0 \\ 1 & 0 & 0 \end{bmatrix} * \begin{bmatrix} 1.649 \\ 1.627 \\ 1.456 \end{bmatrix}$$

$$\delta^2 = \begin{bmatrix} 4.73 \\ 3.28 \\ 1.46 \end{bmatrix}$$

Next, the engine 114 moves on to the next stage of training to derive delta values from the computed error values for the cost function described above. The delta values are required to perform gradient descent on the neural network in order to minimize the cost function.

Exemplary calculations to derive the delta values are set forth below:

$\Delta_{ij}^l = l$: layer, $i$: error of affected neuron in target layer, $j$: neuron in layer $l$ $$\Delta^1 = \delta^2 * (a^1)^T$$

$$\Delta^1 = \begin{bmatrix} 4.73 \\ 3.28 \\ 1.46 \end{bmatrix} * \begin{bmatrix} 1 \\ 0 \\ 1 \end{bmatrix}^T$$

The delta term calculates how wrong the network is within each layer. If the training example [1 0 1] is not transposed, a scalar value is generated. The engine 114 generates a 3×3 matrix, as this is a representation of the number of neurons in each layer and their associated weights. Each neuron receives a vector of size 3.3. Vectors are received for 3 neurons which represents a 3×3 matrix.

$$\Delta^1 = \begin{bmatrix} 4.7300 & 0 & 4.7300 \\ 3.2800 & 0 & 3.2800 \\ 1.4600 & 0 & 1.4600 \end{bmatrix}$$

$$\Delta^2 = \delta^3 * (a^2)^T$$

$$\Delta^2 = \begin{bmatrix} 2.63 \\ 1.97 \\ .99 \end{bmatrix} * \begin{bmatrix} 1.88 \\ 1.88 \\ 1.88 \end{bmatrix}^T$$

$$\Delta^1 = \begin{bmatrix} 8.892 & 8.892 & 8.892 \\ 6.167 & 6.167 & 6.167 \\ 2.745 & 2.745 & 2.745 \end{bmatrix}$$

$$\Delta^3 = \delta^4 * (a^3)^T$$

$$\text{Error of layer } 4 = \delta^4 \begin{bmatrix} .997 \\ .981 \\ .88 \end{bmatrix}$$

$$\Delta^3 = \begin{bmatrix} .997 \\ .981 \\ .88 \end{bmatrix} * \begin{bmatrix} 1.997 \\ 1.977 \\ 1.868 \end{bmatrix}^T$$

$$\Delta^3 = \begin{bmatrix} 1.991 & 1.971 & 1.862 \\ 1.959 & 1.939 & 1.832 \\ 1.757 & 1.73 & 1.644 \end{bmatrix}$$

Now that the delta values have been determined, the engine 114 can go to the next phase of training, to use gradient descent to find the minimum parameters for the cost function. As mentioned above, the training input vector is ([1,0,1]) and the expected training output vector is ([1,1,1]).

The following is exemplary code written for the Matlab™ software application that performs the gradient descent calculations (note that m=training set size; alpha=learning rate):

```
>>
m = 1;
alpha = .01;
x = [1;0;1;];
y = [1;0;1;];
theta1 = [4.7300 3.2800 1.4600; 0 0 0; 4.7300 3.2800 1.4600];
theta1 = theta1 - (alpha / m) * (x' * (theta1 * x - y));
theta2 = [8.892 6.167 2.745; 8.892 6.167 2.745; 8.892 6.167 2.745];
theta2 = theta2 - (alpha / m) * (x' * (theta2 * x - y));
theta3 = [1.991 1.971 1.862; 1.959 1.939 1.832; 1.757 1.73 1.644];
theta3 = theta3 - (alpha / m) * (x' * (theta2 * x - y));
theta3 :    1.7868    1.7668    1.6578
            1.7548    1.7348    1.6278
            1.5528    1.5258    1.4398
z1 = sigmoid(theta1 * x);
z2 = sigmoid(theta2 * z1);
z3 = sigmoid(theta3 * z2);
Output
z1 =
    0.9975
    0.4483
    0.9975
z2 =
    1.000
    1.000
    1.000
z3 =
    0.99458
    0.99404
    0.98921
``` z3 is the predicted value. Thus, given training input vector ([1,0,1]), the result of the predicted value z3 ([0.99458, 0.99404, 0.98921]) approximately matches the expected training output vector of ([1,1,1]). This is expected as a prediction provided by any neural network is an approximation based upon training data.

It should be appreciated that the above is merely an example of the training procedure for the training course classification data model and neural network as described herein, and that other ways of training the data model can be used within the scope of invention.

Now that the data model is trained, the data model execution and updating engine 116 then executes (214) the training course classification data model using the vector generated by the engine 112 for the search query as input to identify neurons that map to the vectors and generate a training course recommendation output vector for the first user. Execution of the training course classification data model comprises moving through the neural network using the input to arrive at an output as described above.

Using the above example, the engine 116 uses the input vector of ([1,0,1])—which corresponds to the search query "angularjs nodejs"—to traverse the training course classification data model and arrive at a predicted output of ([1,1,1]). The output maps to training course recommendation data 118, which comprises one or more suggested training courses to be provided to the client device 102. The training course recommendation data is expected to address the user's anticipated training needs, as identified in the search query. In some embodiments, the engine 116 utilizes a database to map the output vector ([1,1,1]) to, e.g., a list or table of courses that have identifiers associated with the training course recommendation group. The engine 116 stores the training course recommendation data 118 in, e.g., data store 106.

Another important facet of the system 100 described herein is the capability of periodically updating the training course recommendation data model based upon feedback received from one or more users that have taken certain training courses. For example, User A, who had previously entered a search query of "angularjs nodejs," enrolled in a training course generated by the engine 116 using the training course recommendation data model. After completion of the training course, User A may have had a positive response to the course (e.g., he or she gained beneficial knowledge/skills) or User A may have had a negative response to the course (e.g., he or she did not gain beneficial knowledge/skills). User A can supply feedback that reflect the positive or negative response to the system 100, which can then use the feedback to update the training course recommendation data model—so that subsequent executions would be more apt to recommend courses that have positive feedback and less apt to recommend courses that have negative feedback.

As an example, an assumption is that if a user provides positive feedback on a training course, then the search query terms that the user previously entered are considered relevant for the training course. Similarly, if a user provides negative feedback on a training course, then the search query terms that the user previously entered are not considered relevant for the training course—so the goal is to recommend relevant courses based upon search queries.

To update the training course recommendation data model to account for positive and negative feedback, the data model execution and updating engine 116 receives (218) a rating value for a training course. As mentioned above, User A can provide his feedback via client device 102 in the form of, e.g., a numeric rating value (0-10, with 0 being lowest and 10 being highest). The engine 116 can determine that a score of 5 or above is considered positive, while a score of 4 or below is considered negative.

The engine 116 then identifies (220) one or more neurons that are associated with the training course. For example, the particular training course may be assigned to a training course classification group that is associated with a particular output vector. When the rating value is positive, the engine 116 creates (222) a copy of the identified neurons (i.e., the neurons that are associated with the training course that received positive feedback) and inserts the copies into the neural network—thereby influencing the neural network to rank the outputs for the corresponding training courses or groups higher than other training courses or groups, which in turn leads to the neural network recommending those courses more often.

When the rating value is negative, the engine 116 does not create a copy of the corresponding neurons. In some embodiments, the engine 116 may remove the corresponding neurons from the neural network in cases where the user feedback is negative—indicating that the neural network should not recommend those courses any longer.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for generation of a data model for identifying and classifying training needs of individuals, the system comprising:
   a computer data store including unstructured text,
      the unstructured text being input as one or more search queries via a web page, input directly into the computer data store via a first computer file, or any combination thereof, and
   a server computing device in communication with the computer data store and programmed to:
      generate a vector for each of the one or more search queries associated with a first user, the vector comprising one or more elements indicating whether a search term is present in the corresponding search query;
      generate a training course classification data model that comprises a multi-layered neural network by:
         creating a plurality of neurons based upon a plurality of training courses, each neuron assigned a set of feature parameters based upon characteristics of one or more training courses;
         inserting each neuron in a layer of the neural network; and
         connecting neurons between each layer of the neural network;
      execute the training course classification model using one or more of the vectors as input to identify one or more neurons in the neural network that map to the vectors and generate a training course recommendation output vector for the first user, the training course recommendation output vector corresponding to one or more suggested training courses to be provided to the first user;
      provide an identification of the one or more suggested training courses to a client device associated with the first user; and
      update the training course classification data model by:
         receiving a rating value for a suggested training course from the first user via the client device associated with the first user, the rating value corresponding to a relevance of one or more of the search queries associated with the first user to the suggested training course;
         identifying one or more neurons in the neural network associated with the suggested training course for which the rating value is received;
         when the rating value is positive and without taking into account a backpropagation error of the neural network, creating a copy of one or more of the identified neurons and inserting the copy into the neural network to cause the neural network to rank one or more suggested training courses corresponding to the copy higher than other suggested training courses in the training course recommendation output vector; and
         when the rating value is negative and without taking into account a backpropagation error of the neural network, removing one or more of the identified neurons from the neural network to cause the neural network to not include data for one or more suggested training courses corresponding to the removed neurons in the training course recommendation output vector.

2. The system of claim 1, wherein the neural network comprises four or more layers.

3. The system of claim 1, wherein one layer of the neural network comprises an output layer, and the neurons in the output layer comprise a classification score which represents a training course recommendation.

4. The system of claim 1, wherein at least two layers of the neural network comprise hidden layers.

5. The system of claim 1, wherein the elements in the vector are binary values, and a positive binary value indicates a search term is present in the corresponding search query, and a zero or negative binary value indicates a search term is not present in the corresponding search query.

6. The system of claim 5, wherein executing the training course classification model comprises:
   applying a weight to each of the binary values in the vector used as input and combining the weighted binary values to generate a combined value;
   identifying a first neuron in a first layer of the neural network that is associated with the combined value;
   executing an activation function of the identified neuron to generate an output value; and
   identifying a second neuron in a second layer of the neural network that is associated with the output value and is connected to the first neuron.

7. The system of claim 6, wherein the activation function comprises one or more of: a sigmoid function and a rectified linear unit (ReLU) function.

8. The system of claim 1, wherein the training course recommendation output vector corresponds to a training course applicable to the first user based upon the search query.

9. The system of claim 1, wherein the rating value is based upon a sentiment associated with feedback for the training course provided by one or more users.

10. A computerized method in which unstructured computer text is analyzed for generation of a data model for identifying and classifying training needs of individuals, the method comprising:
   storing, in a computer data store, unstructured text, the unstructured text being input as one or more search queries via a web page, input directly into the computer data store via a first computer file, or any combination thereof;
   generating, by a server computing device in communication with the computer data store, a vector for each of the one or more search queries associated with a first user, the vector comprising one or more elements indicating whether a search term is present in the corresponding search query;
   generating, by the server computing device, a training course classification data model that comprises a multi-layered neural network by:
      creating a plurality of neurons based upon a plurality of training courses, each neuron assigned a set of feature parameters based upon characteristics of one or more training courses;
      inserting each neuron in a layer of the neural network; and
      connecting neurons between each layer of the neural network;
   executing, by the server computing device, the training course classification model using one or more of the vectors as input to identify one or more neurons in the neural network that map to the vectors and generate a training course recommendation output vector for the first user, the training course recommendation output vector corresponding to one or more suggested training courses to be provided to the first user;

providing, by the server computing device, an identification of the one or more suggested training courses to a client device associated with the first user; and updating, by the server computing device, the training course classification data model by:
receiving a rating value for a suggested training course from the first user via the client device associated with the first user, the rating value corresponding to a relevance of one or more of the search queries associated with the first user to the suggested training course;
identifying one or more neurons in the neural network associated with the suggested training course for which the rating value is received;
when the rating value is positive and without taking into account a backpropagation error of the neural network, creating a copy of one or more of the identified neurons and inserting the copy into the neural network to cause the neural network to rank one or more suggested training courses corresponding to the copy higher than other suggested training courses in the training course recommendation output vector; and
when the rating value is negative and without taking into account a backpropagation error of the neural network, removing one or more of the identified neurons from the neural network to cause the neural network to not include data for one or more suggested training courses corresponding to the removed neurons in the training course recommendation output vector.

11. The method of claim 10, wherein the neural network comprises four or more layers.

12. The method of claim 10, wherein one layer of the neural network comprises an output layer, and the neurons in the output layer comprise a classification score which represents a training course recommendation.

13. The method of claim 10, wherein at least two layers of the neural network comprise hidden layers.

14. The method of claim 10, wherein the elements in the vector are binary values, and a positive binary value indicates a search term is present in the corresponding search query, and a zero or negative binary value indicates a search term is not present in the corresponding search query.

15. The method of claim 14, wherein executing the training course classification model comprises:
applying a weight to each of the binary values in the vector used as input and combining the weighted binary values to generate a combined value;
identifying a first neuron in a first layer of the neural network that is associated with the combined value;
executing an activation function of the identified neuron to generate an output value; and
identifying a second neuron in a second layer of the neural network that is associated with the output value and is connected to the first neuron.

16. The method of claim 15, wherein the activation function comprises one or more of: a sigmoid function and a rectified linear unit (ReLU) function.

17. The method of claim 10, wherein the training course recommendation output vector corresponds to a training course applicable to the first user based upon the search query.

18. The method of claim 10, wherein the rating value is based upon a sentiment associated with feedback for the training course provided by one or more users.

19. A non-transitory computer readable storage medium comprising programmatic instructions for operation of a computing environment in which unstructured computer text is analyzed for generation of a data model for identifying and classifying training needs of individuals, the instructions operable to cause:
a computer data store to store unstructured text, the unstructured text being input as one or more search queries via a web page, input directly into the computer data store via a first computer file, or any combination thereof, and
a server computing device in communication with the computer data store, and including programming to execute a multi-layered neural network, the server computing device programmed to:
generate a vector for each of the one or more search queries associated with a first user, the vector comprising one or more elements indicating whether a search term is present in the corresponding search query;
generate a training course classification data model that comprises a multi-layered neural network by:
creating a plurality of neurons based upon a plurality of training courses, each neuron assigned a set of feature parameters based upon characteristics of one or more training courses;
inserting each neuron in a layer of the neural network; and
connecting neurons between each layer of the neural network;
execute the training course classification model using one or more of the vectors as input to identify one or more neurons in the neural network that map to the vectors and generate a training course recommendation output vector for the first user, the training course recommendation output vector corresponding to one or more suggested training courses to be provided to the first user;
provide an identification of the one or more suggested training courses to a client device associated with the first user; and
update the training course classification data model by:
receiving a rating value for a suggested training course from the first user via the client device associated with the first user, the rating value corresponding to a relevance of one or more of the search queries associated with the first user to the suggested training course;
identifying one or more neurons in the neural network associated with the suggested training course for which the rating value is received;
when the rating value is positive and without taking into account a backpropagation error of the neural network, creating a copy of one or more of the identified neurons and inserting the copy into the neural network to cause the neural network to rank one or more suggested training courses corresponding to the copy higher than other suggested training courses in the training course recommendation output vector; and when the rating value is negative and without taking into account a backpropagation error of the neural network, removing one or more of the identified neurons from the neural network to cause the neural network to not include data for one or more suggested training courses corresponding to the removed neurons in the training course recommendation output vector.

* * * * *